United States Patent [19]

Casteen et al.

[11] Patent Number: 4,673,546

[45] Date of Patent: Jun. 16, 1987

[54] PRESSURIZER LOOP SEAL INSULATION ASSEMBLY

[75] Inventors: Lynn A. Casteen, Lancaster; Kim T. Gilbert, Columbus; Raj L. Patel; Steven R. Snoke, both of Lancaster, all of Ohio

[73] Assignee: The Babcock & Wilcox Company, New Orleans, La.

[21] Appl. No.: 595,173

[22] Filed: Mar. 30, 1984

[51] Int. Cl.⁴ .............................................. G21C 9/00
[52] U.S. Cl. ..................................... 376/289; 376/307
[58] Field of Search ............... 376/287, 288, 289, 291, 376/307

[56] References Cited

U.S. PATENT DOCUMENTS

| | | | |
|---|---|---|---|
| 3,159,550 | 12/1964 | Laming | 376/287 |
| 3,245,879 | 4/1966 | Purdy et al. | 376/287 |
| 3,753,853 | 8/1973 | Schabert | 376/287 |
| 3,930,943 | 1/1976 | Michel et al. | 376/287 |
| 4,038,134 | 7/1977 | Dorner et al. | 376/288 |

FOREIGN PATENT DOCUMENTS

| | | | |
|---|---|---|---|
| 19027 | 2/1982 | Japan | 376/307 |
| 944500 | 12/1963 | United Kingdom | 376/287 |

*Primary Examiner*—Deborah L. Kyle
*Assistant Examiner*—Richard W. Wendtland
*Attorney, Agent, or Firm*—Robert J. Edwards; Mark B. Quatt

[57] ABSTRACT

A reflective type insulation is utilized to elevate the temperature in the loop seal of a pressurizer. Damage to safety valve components and downstream piping caused by water in the piping is substantially reduced by exposing the loop seal piping to a portion of the outer surface of the pressurizer. Safety valve allowable sustained operating temperature requirements are considered in the insulation system design.

4 Claims, 10 Drawing Figures

1

PRESSURIZER LOOP SEAL INSULATION ASSEMBLY

BACKGROUND OF THE INVENTION

This invention relates to a loop seal insulation assembly for the loop seal piping of a pressurized water nuclear reactor system.

In a pressurized water nuclear reactor, a core of fissionable material is cooled by a flow of primary coolant which flows past the core during operation of the reactor and picks up heat emitted by the fissionable material. The primary coolant is under considerable pressure during this process. This high pressure is maintained by means of a pressurizer, an upright pressure vessel equipped with apparatus designed to maintain the primary coolant at the desired level.

A loop seal piping system is typically located at each of three different azimuths near the top head of the pressurizer. This piping has a generally S-shaped configuration and connects the pressurizer at one end with a safety valve at its other end. By virtue of its configuration, the typically uninsulated piping acts as a thermal buffer between the pressurizer and the safety valve by collecting cooled condensate upstream of the safety valve. Such a buffer is necessary because the safety valve is not rated for continuous high temperature service. The safety valve is pressure-sensitive and activates, i.e. opens, when excess pressure builds up in the pressurizer. The safety valve operates periodically in actual service, and protects the nuclear steam supply system from over-pressurization.

Problems in the operation of this valve have occurred in the past. For example, at the Three Mile Island nuclear facility, it has been observed that after activation of a safety valve in a loop seal assembly, the valve did not reseat properly. In this connection, it is known that water condenses inside conventional loop seal piping and accumulates in the curved section of the piping. When the valve is actuated, this slug of water will travel downstream and through the safety valve, having a destructive effect on valve components as well as a "water hammer" effect on downstream piping.

In order to ensure that less-destructive steam rather than liquid water flows through the safety valve during valve activation, while maintaining the temperature near the valve relatively low during normal operation, a temperature in the range of about 250° F. to 350° F., and preferably in the range of about 310° F. to 350° F. is required at the loop seal pipe/safety valve interface.

Various means have been proposed to accomplish the maintenance of such temperature ranges within the loop seal piping. For example, electrical heat tracing could be used. Such a system would have the disadvantage of high cost, however. Additionally, such a system would be an "active" one requiring procedures and backup apparatus to insure its operability under all conditions. Of course, a massive redesign of downstream piping and safety valve components and restraints to withstand the damaging effects of water transport at high velocities is possible, but such modifications are time consuming and costly.

The use of conventional pipe insulation would appear to be a practical alternative. Insulation is presently used on the upper part of the pressurizer and sometimes on a portion of the loop seal piping nearest the pressurizer. However, careful analysis of this alternative has demonstrated that simply insulating the entire length of loop seal piping does not transfer enough heat to raise the temperature in the vicinity of the loop seal pipe/safety valve interface to the desired level.

It has been found that the use of reflective type insulation combined with exposure of part of the pressurizer surface to the loop seal piping, has provided the needed temperature range in the piping, and in particular at the loop seal/valve interface. The invention takes advantage of radiative and convective as well as conductive modes of heat transfer to achieve the desired temperature elevation by removing a portion of existing insulation typically present on the upper portion of a pressurizer. The area on the upper portion of the pressurizer from which insulation is removed is defined by analysis for any particular system, and in no case is greater than the area defined by the inner case of the reflective type insulation.

The practice of the present invention provides a relatively inexpensive means of substantially reducing damage to safety valve components and downstream piping. It is a passive system and therefore reliable, not depending on outside power sources or the like. Furthermore, reflective type insulation has proven to be a low-maintenance material in other applications.

A major advantage of this invention is the inherent flexibility of the system, which allows adjustment of individual insulation panels to produce desired temperature variations as required. Safety valve allowable sustained operating temperature requirements are considered in the design of the insulation system. Thus, the elevated temperature obtained by the practice of the invention should not exceed allowable sustained operating temperatures for the valve.

SUMMARY OF THE INVENTION

In accordance with the invention, an apparatus which substantially reduces damage to valve components and downstream piping during activation of a loop seal safety valve comprises a housing of reflective type insulation panels arranged around the loop seal in a manner allowing a portion of the outer surface of the pressurizer to be exposed to the loop seal, such that radiative and convective heat transfer from the outer surface of the pressurizer to the loop seal will substantially effect an elevated temperature at the loop seal/safety valve interface.

BRIEF DESCRIPTION OF THE DRAWINGS

In the accompanying drawings, forming a part of this specification, and in which reference numerals shown in the drawings designate like or corresponding parts throughout the same.

DETAILED DESCRIPTION OF THE PREFERRED EMBODIMENT

Figure 1:
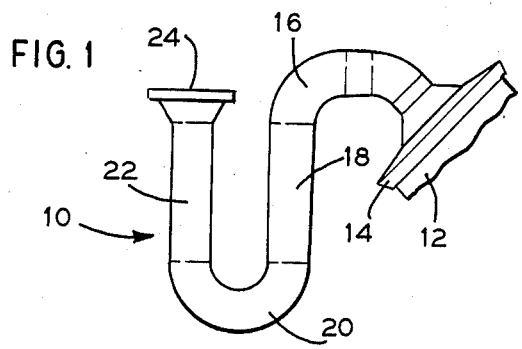
FIG. 1 is a schematic view of a typical loop seal.

Referring to the drawings, FIG. 1 is a schematic view of a typical loop seal 10. At one pipe, the loop seal pipe interfaces with the pressurizer 12 at the loop seal nozzle 14. For approximately the first two feet (as measured along the centerline) of the loop seal piping, a constant supply of steam is present within the piping during normal operation. This regime ends at a steam/water interface 16. Proceeding from this interface is a straight section 18, a curved section 20, and another straight section 22 ending at an opposite end in a loop seal pipe/safety valve interface 24.

Figure 2:
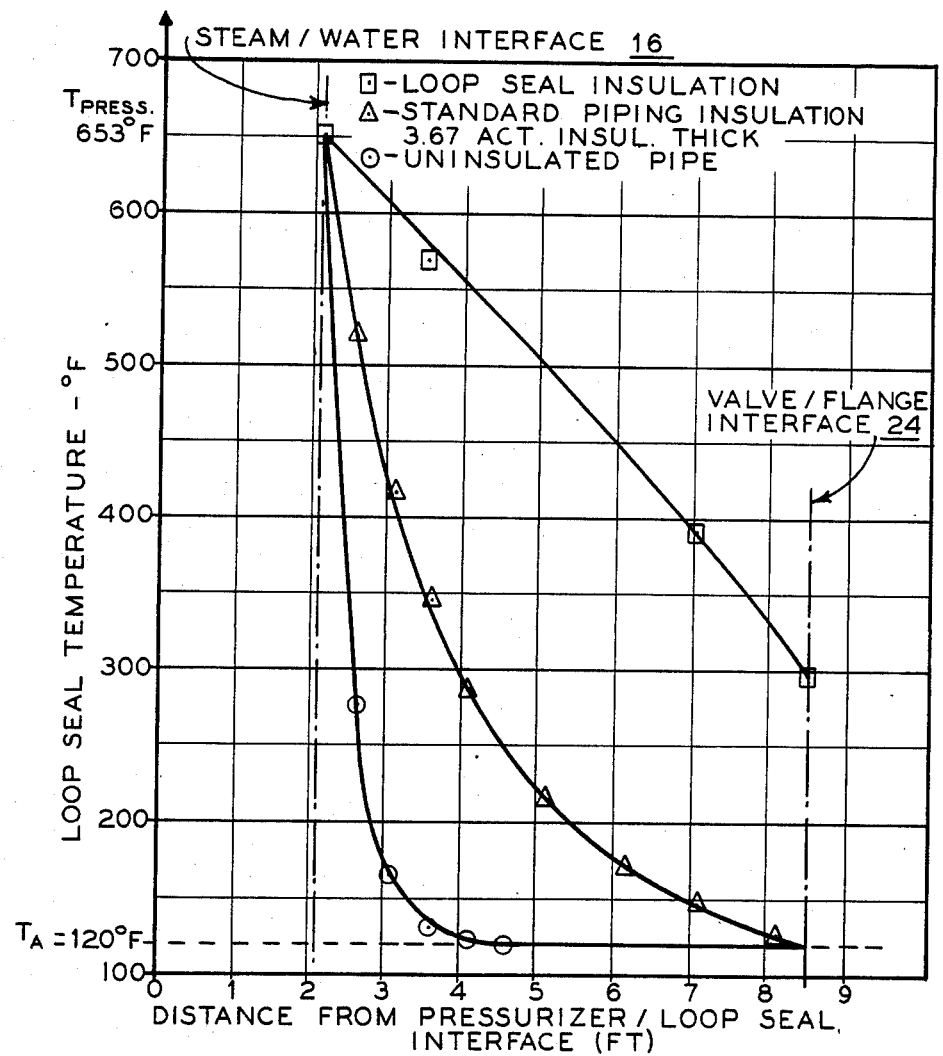
FIG. 2 is a graph depicting the temperature profile in the loop seal piping under different loop seal insulation arrangements.

FIG. 2 depicts three loop seal temperature profiles calculated for an actual loop seal system. The lowest curve, denoted by circles plotted on the curve, represents a completely uninsulated loop seal pipe exposed directly to ambient temperature. The intermediate curve, denoted by triangles plotted on the curve, represents a loop seal insulated in a conventional manner with standard reflective-type insulation. The highest curve denoted by squares plotted on the curve, represents a loop seal enclosed with reflective type insulation according to the present invention.

It is readily seen that the present invention provides an elevated temperature at the critical loop seal pipe/safety valve interface 24. The temperature at interface 24 is about 300° F., considerably higher than 120° F. achieved by the alternative means described above.

For all three curves, no temperature decay should occur for about the first two feet of piping, as measured along the loop seal pipe centerline, because of the constant presence of steam in this portion of loop seal pipe 10. The temperature profile for an uninsulated loop seal pipe (lower curve) or a loop seal insulated with a conventional piping insulation configuration quickly degrades with distance from the pressurizer. A principal reason for the superior results obtained by the practice of the present invention is the capture of radiative and convective heat from the pressurizer surface by the loop seal pipe 10.

The remaining figures illustrate a typical loop seal insulation assembly in accordance with the present invention. It was noted earlier that typically three loop seals are present at different azimuths near the top head of a pressurizer. These three loop seals are clustered together rather than spaced equidistant around the top of the pressurizer head. While FIGS. 3 through 10 disclose an illustrative embodiment of a first insulation assembly, similar assemblies will be used for the second and third loop seals of a pressurizer, with suitable modifications made to accomodate existing interferences, existing top head insulation, and the like. One of the features of this invention is its flexibility in allowing small adjustments in the placement of individual insulation panels in order to achieve the desired elevated temperature at the safety valve/flange interface.

Figure 3:
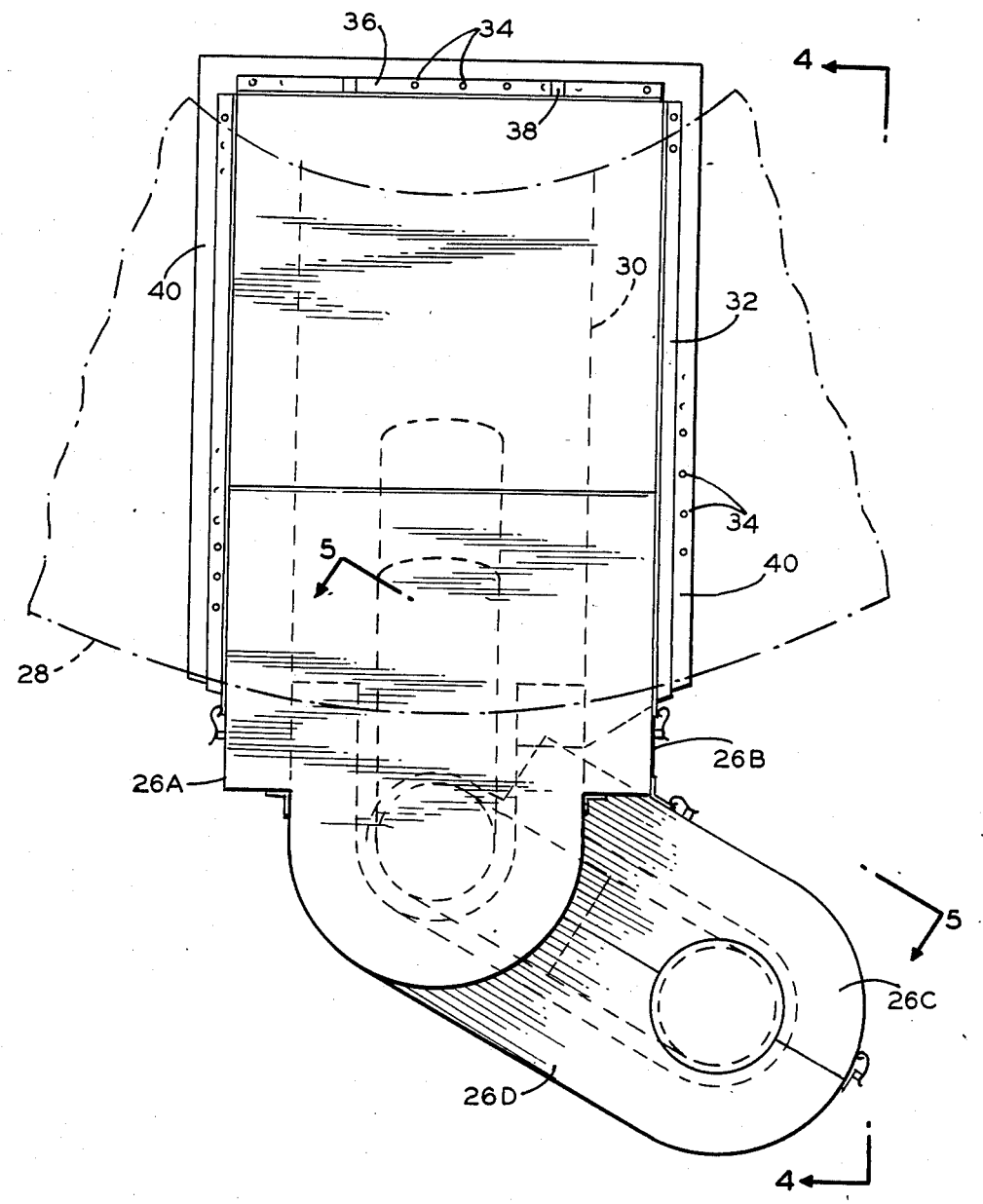
FIG. 3 is a plan view of a first loop seal insulation assembly.
Figure 4:
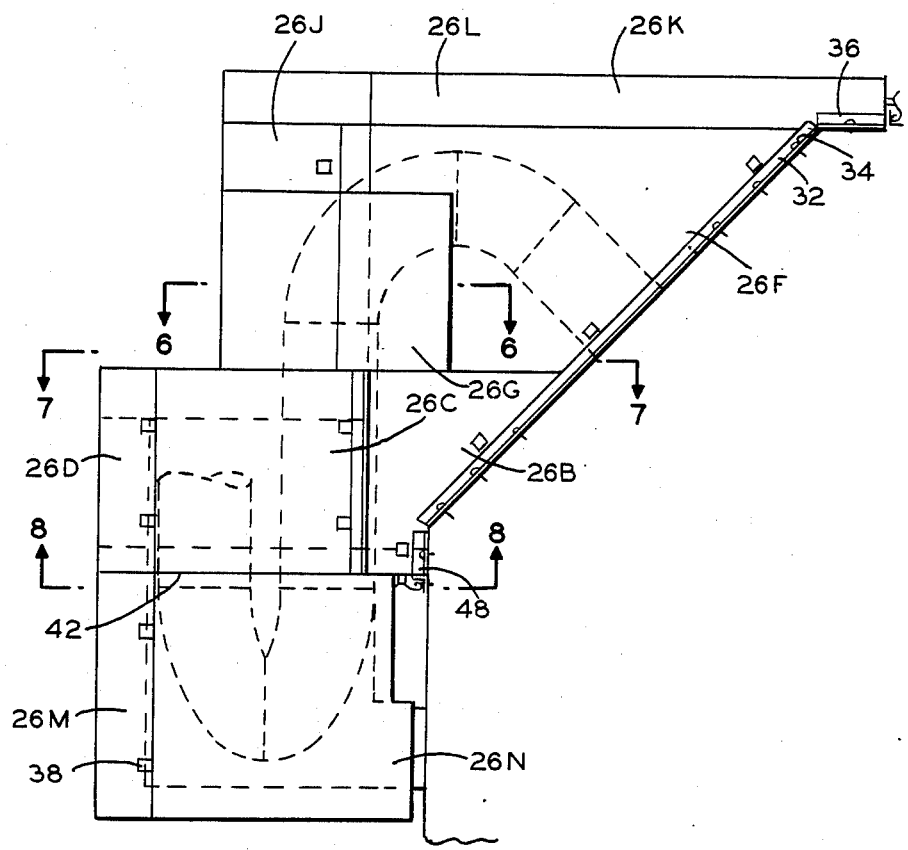
FIG. 4 is an elevational view of a first loop seal insulation assembly taken along line 4—4 of FIG. 3.
Figure 5:
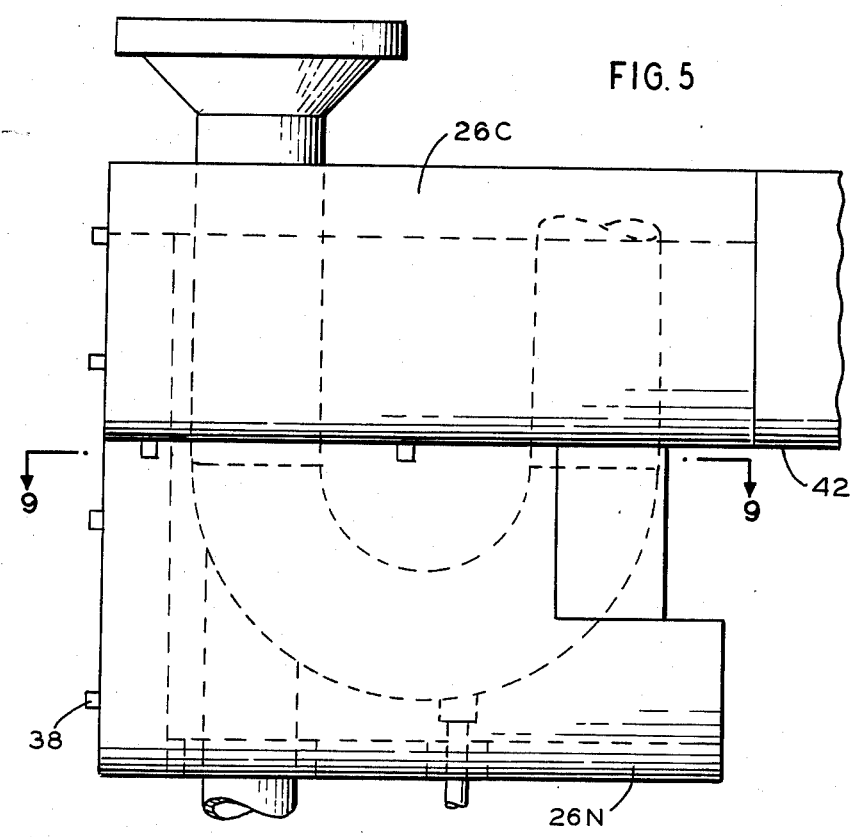
FIG. 5 is an elevational view of a first loop seal insulation assembly taken along line 5—5 of FIG. 3.

FIG. 3 shows a plan view of a typical loop seal insulation housing in accordance with the invention. Reflective type insulation panels 26 are placed over existing top head insulation 28 shown in phantom. A portion of existing top head insulation 28 is removed to correspond with the inner case 30 of loop seal insulation panels 26, thereby exposing a portion of the outer surface of the pressurizer to the loop seal piping.

Angle 32 is attached by screws 34 or other suitable attachment means to the existing top head insulation 28. Likewise, angle 36 is attached by screws 34 or other suitable attachment means to the top flat portion of existing top head insulation 28. Self-locking buckles 38 hold the reflective type insulation panels 26 in place, and allow selective removal or replacement of individual panels 26 as well understood in the art.

Reinforcement plates 40 are popriveted or otherwise attached to the outer case of existing top head insulation 28.

The insulation assembly of the present invention is designed to physically and thermally accomodate and adjust for interferences such as hangers, gratings 42 (FIG. 4), grating supports 44 (FIG. 9) and other components already installed in the vicinity of the loop seal piping and top head of the pressurizer.

Individual insulation panels 26A and 26B straddle a portion of the loop seal nearest the pressurizer and are buckled to angle 32. Insulation panels 26C and 26D are buckled to each other at their juncture, and to panels 26B and 26A respectively, and encompass the intermediate portion of loop seal pipe 10.

Vertically below panels 26C and 26D are located insulation panels 26M and 26N, encompassing the curved portion 20 of loop seal pipe 10.

Figure 6:
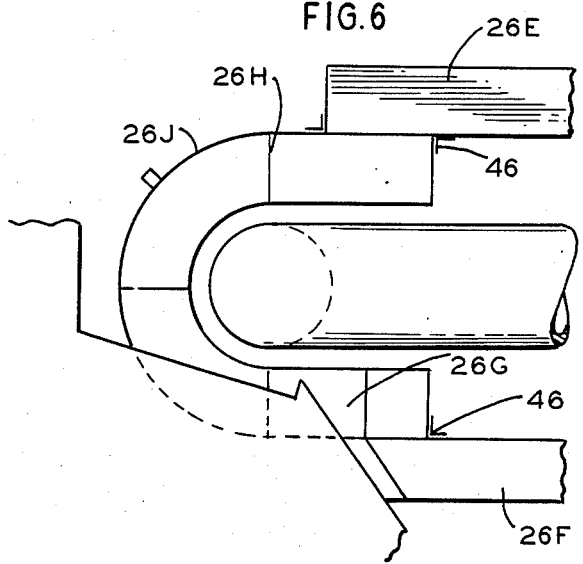
FIG. 6 is a section view of a portion of a first loop seal insulation assembly taken along line 6—6 of FIG. 4.
Figure 7:
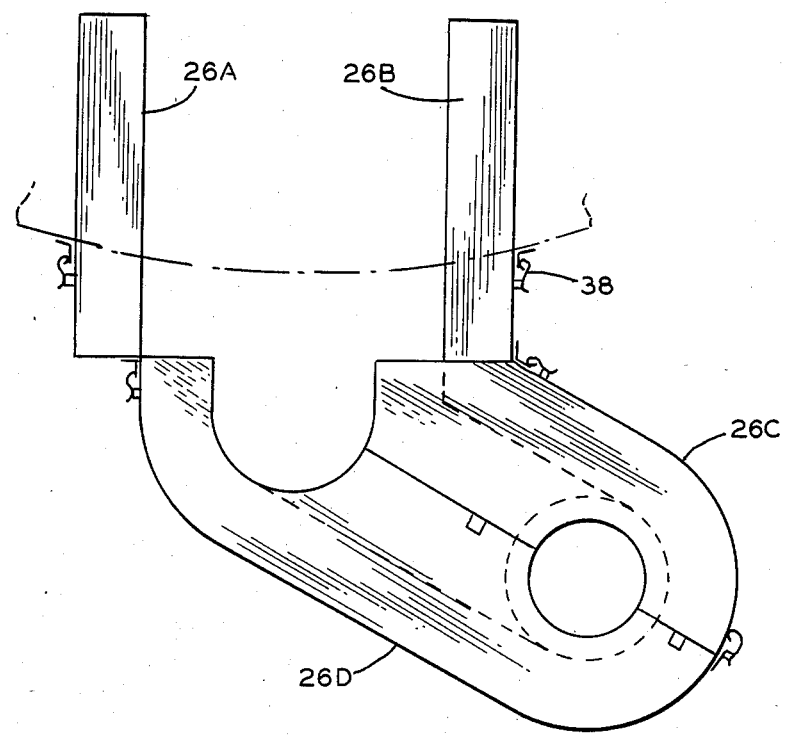
FIG. 7 is a plan view of a portion of a first loop seal insulation assembly taken along line 7—7 of FIG. 4.
Figure 8:
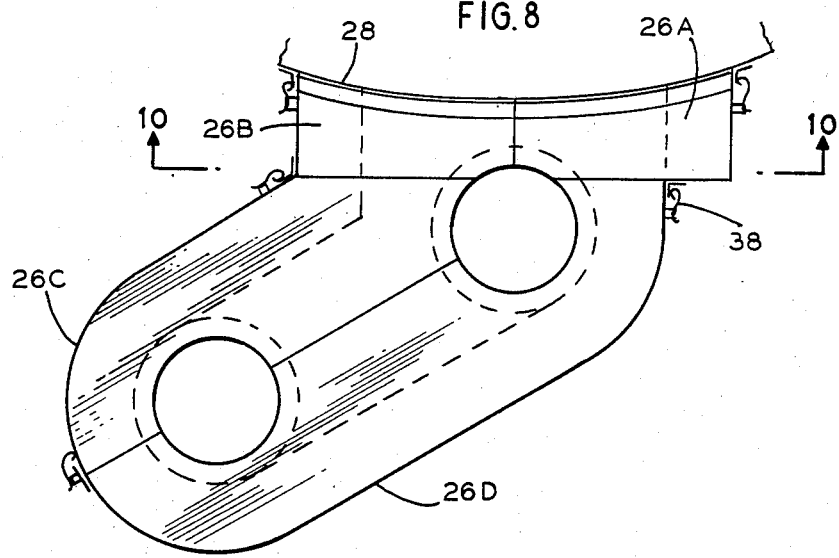
FIG. 8 is a bottom view of a portion of a first loop seal insulation assembly taken along line 8—8 of FIG. 4.
Figure 9:
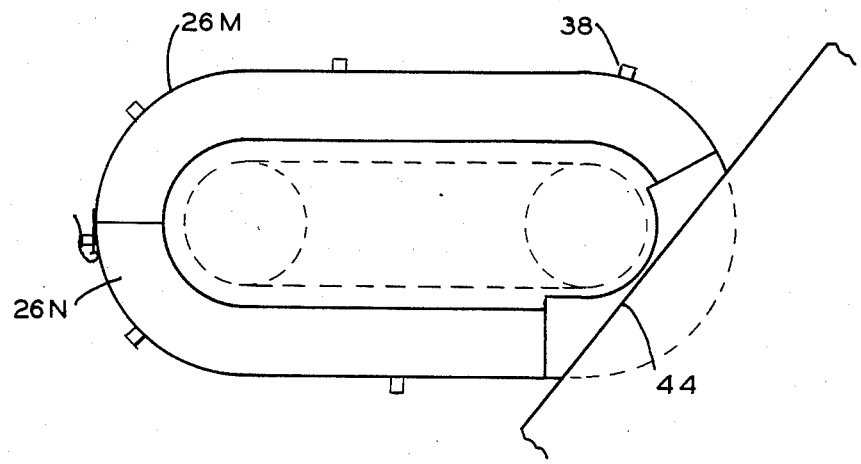
FIG. 9 is a section view of a portion of a first loop seal insulation assembly taken along line 9—9 of FIG. 5.

Angles 46 are attached, preferably spot-welded, to panels 26G and 26H, and popriveted or otherwise suitably attached to panels 26E and 26F, as best seen in FIG. 6.

Figure 10:
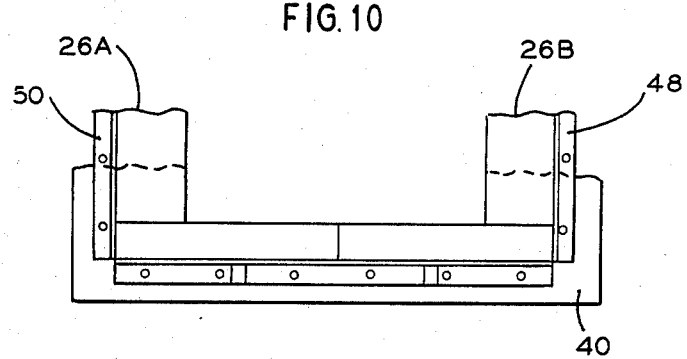
FIG. 10 is a section view of a portion of a first loop seal insulation assembly taken along line 10—10 of FIG. 8.

FIG. 10 illustrates angles 48 and 50 buckled to insulation panels 26B and 26A respectively, and screwed or otherwise attached to existing top head insulation.

It should be noted that the preferred embodiment described above is illustrative only, and a similar arrangement may be utilized, with appropriate changes to accomodate the specific interferences and existing equipment found at a particular plant site.

What is claimed is:

1. In a pressurized water nuclear reactor system of the type having a pressurizer, a safety valve, and an uninsulated loop seal pipe connecting the pressurizer and safety valve, the loop seal pipe having a first end communicating with the pressurizer to define a loop seal pipe/pressurizer interface and a second end communicating with the safety valve to define a loop seal pipe/safety valve interface, means for raising temperature at the loop seal pipe/safety valve interface comprising a plurality of thermally insulated panels interconnected to form a housing enclosing at least a portion of the loop seal pipe proximate the pressurizer and a portion of the pressurizer proximate the first end of the loop seal pipe, the said portion of the pressurizer having an uninsulated outer surface exposed to the loop seal pipe within the housing so that heat can be transferred from the outer surface to the loop seal pipe.

2. A pressurized water nuclear reactor system, as set forth in claim 1, wherein the insulated panels comprise reflective type insulation panels.

3. A pressurized water nuclear reactor system, as set forth in claim 2, wherein the pressurizer includes a top head including the first-mentioned portion of the pressurizer and a second portion, further comprising top head insulation mounted to the second portion, attachment means mounted to the top head insulation for supporting the insulated panels, and means for removably mounting the insulated panels to the attachment means.

4. A pressurized water reactor system, as set forth in claim 3, wherein the means for removably mounting the insulated panels to the attachment means comprises a plurality of self-locking buckles.

* * * * *